United States Patent
Yamashita et al.

(10) Patent No.: US 6,901,222 B2
(45) Date of Patent: May 31, 2005

(54) OPTICAL TRANSMISSION SYSTEM AND TERMINAL DEVICE APPLICABLE TO THE SYSTEM

(75) Inventors: Shinji Yamashita, Kawasaki (JP); Kazuyuki Mori, Kawasaki (JP); Tamotsu Akashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/002,152

(22) Filed: Dec. 5, 2001

(65) Prior Publication Data

US 2002/0041728 A1 Apr. 11, 2002

Related U.S. Application Data

(63) Continuation of application No. PCT/JP99/04400, filed on Aug. 13, 1999.

(51) Int. Cl.[7] .............................................. H04B 10/00
(52) U.S. Cl. ......................... 398/162; 398/63; 398/193
(58) Field of Search ................................ 359/110, 173, 359/161, 187, 121, 153; 398/162, 193, 197, 63

(56) References Cited

U.S. PATENT DOCUMENTS

| 4,558,465 A | * | 12/1985 | Siegel et al. ................ 359/184 |
| 4,708,424 A | * | 11/1987 | Marhic ......................... 385/46 |
| 5,063,612 A | * | 11/1991 | McKeown ................... 398/136 |
| 5,526,160 A | * | 6/1996 | Watanabe et al. ............ 359/163 |
| 5,822,099 A | * | 10/1998 | Takamatsu ................... 359/153 |

FOREIGN PATENT DOCUMENTS

| JP | 01-232804 A | 9/1989 |
| JP | 04-290483 A | 10/1992 |
| JP | 06-112561 A | 4/1994 |
| JP | 06-161555 A | 5/1994 |
| JP | 07-264131 A | 10/1995 |
| JP | 10-163960 A | 6/1998 |
| JP | 10-275939 A | 10/1998 |
| JP | 11-126935 A | 5/1999 |

* cited by examiner

*Primary Examiner*—Leslie Pascal
*Assistant Examiner*—Christina Y Leung
(74) *Attorney, Agent, or Firm*—Staas & Halsey LLP (57) ABSTRACT

Disclosed herein is a terminal device including a photodetector, amplitude detecting circuit, light source, drive circuit, and control circuit. The photodetector receives a first optical signal. The amplitude detecting circuit detects the amplitude of an output from the photodetector. The drive circuit supplies a drive current to the light source so that the light source outputs a second optical signal. The control circuit decreases and increases the drive current according to an increase and decrease in the amplitude detected by the amplitude detecting circuit, respectively. In the case that this terminal device is used with another terminal device to construct a network, the dynamic range of the other terminal device can be reduced. Accordingly, the use of this terminal device can improve the extensibility of the network.

16 Claims, 9 Drawing Sheets

32 BRANCHES

FIG. 5A(b)

64 BRANCHES

OPTICAL TRANSMISSION SYSTEM AND TERMINAL DEVICE APPLICABLE TO THE SYSTEM

This application is a continuation application, filed under 35 U.S.C. §111(a), of International Application PCT/JP99/04400, filed Aug. 13, 1999, it being further noted that priority is based upon International Patent Application PCT/JP99/4400, filed Aug. 13, 1999.

BACKGROUND OF THE INVENTION

1. Field of the Invention

The present invention relates to an optical transmission system suitable for bidirectional transmission, and also to a terminal device applicable to this system.

2. Description of the Related Art

The international standard specifications of an ATM-PON (Asynchronous Transfer Mode-Passive Optical Network) system are defined in ITU-T: G983.1. This system includes a plurality of ONUs (Optical Network Units) as subscriber terminals, an OLT (Optical Line Terminal) as an office terminal device, and an optical star coupler for connecting the ONUs to the OLT so that bidirectional transmission is allowed between each ONU and the OLT.

In general, the transmitting power of each ONU is constant. Accordingly, the receiving power of the OLT is attenuated by losses in optical fiber transmission lines for connecting each ONU and the OLT, and the dynamic range in a receiving section of the OLT reflects a difference in the losses between the optical fiber transmission lines. Accordingly, a circuit in the receiving section of the OLT is required to instantaneously discriminate between "0" and "1" in a burst data sequence having a large dynamic range, so that the configuration of the circuit becomes complex. Further, in the case that there arises a requirement for expansion of a network, such as a requirement for relocation of a certain one of the ONUs from an original position to a far position or to a near position or a requirement for increase in the number of subscribers, it is required that the transmitting power of each ONU reaching the OLT falls within a receivable level range of the OLT, causing a difficulty of flexible expansion of the network.

As measures against such a problem, it is effective to detect a transmission line loss from the receiving power of each ONU, control the transmitting power of each ONU according to the result of this detection, and reduce the dynamic range in the receiving section of the OLT. For example, Japanese Patent Laid-open No. Hei 4-269023 discloses an optical transmission system having means provided in the OLT for outputting an optical signal at a substantially constant level, means provided in each ONU for detecting a transmission line loss from the level of a received optical signal, and means provided in each ONU for adjusting the level of an optical signal to be transmitted from each ONU according to the result of this detection of the transmission line loss so that the OLT can receive an optical signal at a substantially constant level. However, the purpose of reducing the dynamic range in the receiving section of the OLT in this prior art system is to facilitate the design of a circuit in the receiving section, and there is no mention about a method for increasing the dynamic range in a transmitting section, which becomes important in aiming at the extension of a network. Accordingly, the effect of the extension of a network by the prior art system is low.

SUMMARY OF THE INVENTION

It is therefore an object of the present invention to provide an optical transmission system improved in the extensibility of a network.

It is another object of the present invention to provide a terminal device applicable to such an optical transmission system.

Other objects of the present invention will become apparent from the following description.

In accordance with an aspect of the present invention, there is provided a system including a first terminal device, a second terminal device, and an optical fiber transmission line for connecting the first and second terminal devices. The first terminal device includes a first light source for outputting a first optical signal to the optical fiber transmission line. The second terminal device includes a second light source, a drive circuit for supplying a drive current to the second light source so that the second light source outputs a second optical signal to the optical fiber transmission line, a photodetector for receiving the first optical signal from the optical fiber transmission line, an amplitude detecting circuit for detecting the amplitude of an output from the photodetector, and a control circuit for decreasing and increasing the drive current according to an increase and decrease in the amplitude detected by the amplitude detecting circuit.

Preferably, the second terminal device further includes a prebias circuit for adding a bias current to the drive current so that the oscillation delay jitter of the second optical signal decreases.

The second optical signal may be a burst signal, for example. In this case, the prebias circuit may output the bias current immediately before the first bit of the burst signal is generated.

Preferably, the second terminal device further includes a circuit for controlling the second light source so that the duty of the second optical signal is maintained constant, according to the amplitude detected by the amplitude detecting circuit.

The second terminal device includes a plurality of subscriber terminals. In this case, a star coupler for connecting the plurality of subscriber terminals to the first terminal device is used.

In accordance with another aspect of the present invention, there is provided a terminal device including a photodetector for receiving a first optical signal, an amplitude detecting circuit for detecting the amplitude of an output from the photodetector, a light source, a drive circuit for supplying a drive current to the light source so that the light source outputs a second optical signal and a control circuit for decreasing and increasing the drive current according to an increase and decrease in the amplitude detected by the amplitude detecting circuit.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 5A(a) to 5C(b) are block diagrams for illustrating the extensibility of a network;

DETAILED DESCRIPTION OF THE PREFERRED EMBODIMENTS

Some preferred embodiments of the present invention will now be described in detail with reference to the attached drawings. Throughout the drawings, the same reference numerals denote like or corresponding parts.

Figure 1:
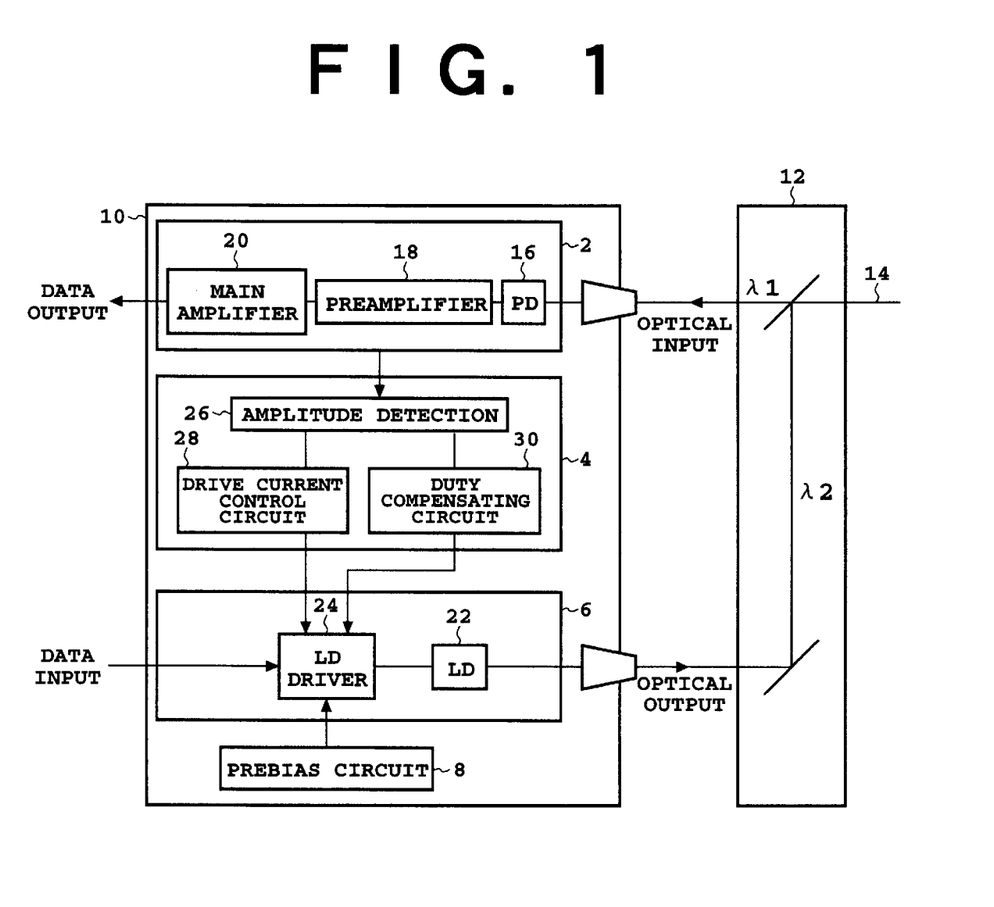
FIG. 1 is a block diagram showing a preferred embodiment of the terminal device according to the present invention.

FIG. 1 is a block diagram showing a preferred embodiment of the terminal device according to the present invention. This device may be used as each ONU in an ATM-PON system. This terminal device includes a main circuit 10 and a WDM (wavelength division multiplexing) coupler 12 optically connected to the main circuit 10. The main circuit 10 includes a receiving section 2 for receiving an optical signal having a wavelength $\lambda 1$ (e.g., 1.5 $\mu$m), a current control circuit 4, a transmitting section 6 for transmitting an optical signal having a wavelength $\lambda 2$ (e.g., 1.3 $\mu$m), and a prebias circuit 8. The WDM coupler 12 couples the optical input having the wavelength $\lambda 1$ relating to the receiving section 2 and the optical output having the wavelength $\lambda 2$ relating to the transmitting section 6 to the same optical path 14.

The receiving section 2 includes a photodetector (PD) 16 for converting the optical signal having the wavelength $\lambda 1$ into a current signal, a preamplifier 18 for converting the current signal output from the photodetector 16 into a voltage signal, and a main amplifier 20 for amplifying the output from the preamplifier 18 to obtain a data output.

The transmitting section 6 includes a laser diode (LD) 22 as a light source for outputting the optical signal having the wavelength $\lambda 2$, and an LD driver 24 for driving the laser diode 22 according to a data input.

The current control circuit 4 includes an amplitude detecting circuit 26 for detecting a value corresponding to the amplitude of the optical signal having the wavelength $\lambda 1$ according to a signal from the receiving section 2, a drive current control circuit 28 for decreasing and increasing a drive current for the laser diode 22 according to an increase and decrease in the amplitude detected by the amplitude detecting circuit 26, respectively, and a duty compensating circuit 30 for compensating for the duty of the optical signal to be output from the laser diode 22 according to the amplitude detected by the amplitude detecting circuit 26. For example, the compensating circuit 30 controls the drive current to be supplied from the LD driver 24 to the laser diode 22 so that the duty of the optical signal to be output from the laser diode 22 is maintained constant.

The prebias circuit 8 adds a bias current to the drive current to be supplied from the LD driver 24 to the laser diode 22 so that the oscillation delay jitter of the optical signal to be output from the laser diode 22 is decreased, for example. The optical signal to be output from the laser diode 22 is a burst signal in this preferred embodiment. In this case, the prebias circuit 8 outputs the bias current immediately before the first bit of the burst signal is generated.

It is important to increase the dynamic range in the transmitting section 6 from the viewpoint that the extensibility of a network is to be raised. The upper limit of the transmitting power is determined by a maximum rated value in the laser diode 22, but the lower limit of the transmitting power is an issue to be considered. In the prior art, there is no consideration as to the degree of power reduction that can be attained, and a satisfactory variable range of power cannot be obtained from the viewpoint of the extensibility of a network.

Figure 2A:
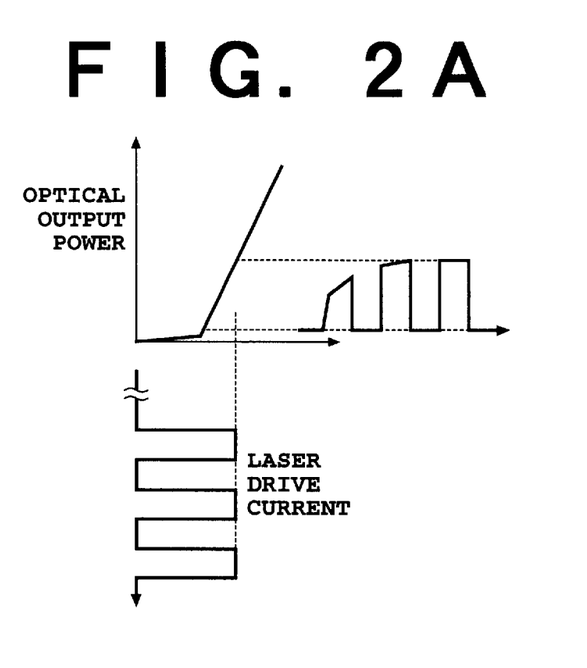
FIGS. 2A and 2B are diagrams showing modulation characteristics of a laser diode in the cases that no bias is applied and that a prebias is applied, respectively.

The problem arising in lowering the transmitting power is oscillation delay jitter, and the lower limit of the transmitting power is given by a prescribed value of the oscillation delay jitter. The oscillation delay jitter is a phenomenon such that a signal waveform is degraded at the time a bit "1" rises as shown in FIG. 2A. That is, when a bit "1" rises after long continuation of a data sequence of "0", the bit "1" does not normally rise to cause a degradation in signal waveform, because time is required until a carrier density required for emission from the laser diode 22 is reached. Further, the prescribed value of the oscillation delay jitter is a degradation quantity of the pulse width of one bit due to the oscillation delay jitter. If the oscillation delay jitter is lower than this prescribed value, normal transmission can be performed.

Figure 2B:
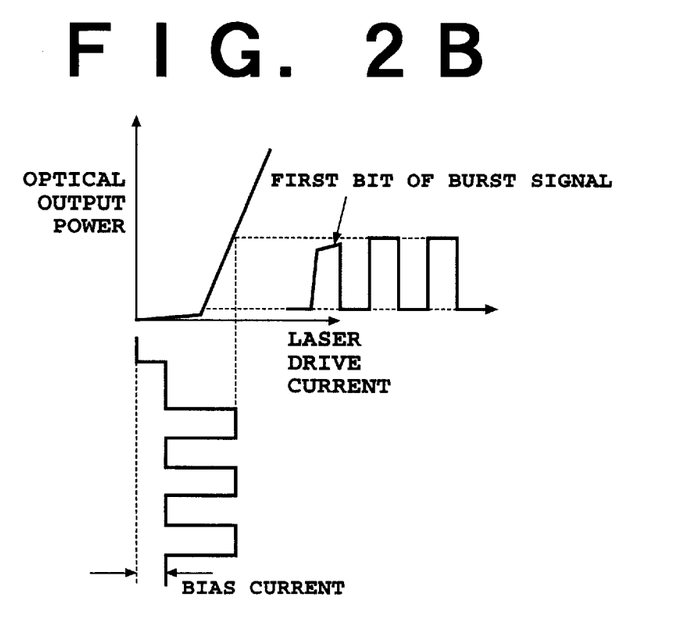

In this respect, the terminal device shown in FIG. 1 employs the prebias circuit 8 to reduce the transmitting power satisfying the prescribed value of the oscillation delay jitter as far as possible. As shown in FIG. 2B, the prebias circuit 8 preliminarily supplies a bias current to the LD driver 24 immediately before the burst signal is generated, thereby allowing carrier accumulation and normally raising the first bit of the burst signal.

Figure 3:
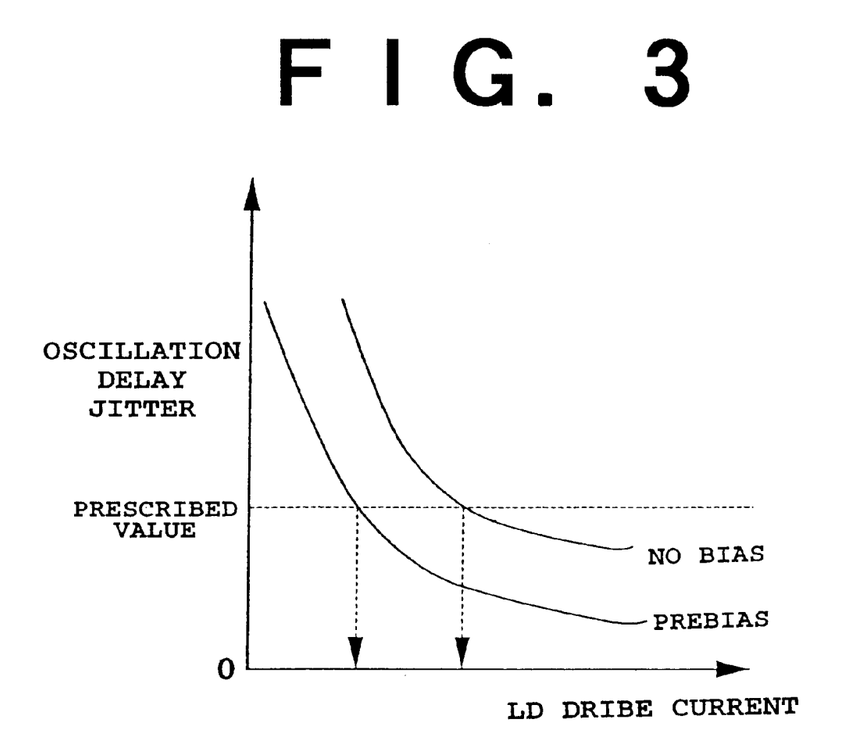
FIG. 3 is a graph showing the relation between oscillation delay jitter and LD drive current.

FIG. 3 is a graph showing the relation between the oscillation delay jitter and the LD drive current. As mentioned above, the oscillation delay jitter can be suppressed by providing the prebias circuit 8. Accordingly, as compared with the case that the prebias circuit 8 is not provided, the curve shown in FIG. 3 can be shifted down, so that a minimum LD drive current satisfying the prescribed value of the oscillation delay jitter can be reduced. In the prior art, there are no measures against waveform degradation in reducing the transmitting power at each ONU in the case of system extension, and the dynamic range reducing effect in the receiving section of the OLT is therefore insufficient. In contrast, according to this preferred embodiment, the variable range of the transmitting power at each ONU can be increased, so that the dynamic range reducing effect in the OLT receiving section can be improved to thereby raise the extensibility of a network. Further, a sensitivity demand to the OLT receiving section can be relaxed by utilizing the reduction of the dynamic range, so that the circuit of the OLT receiving section can be easily designed.

Figure 4A:
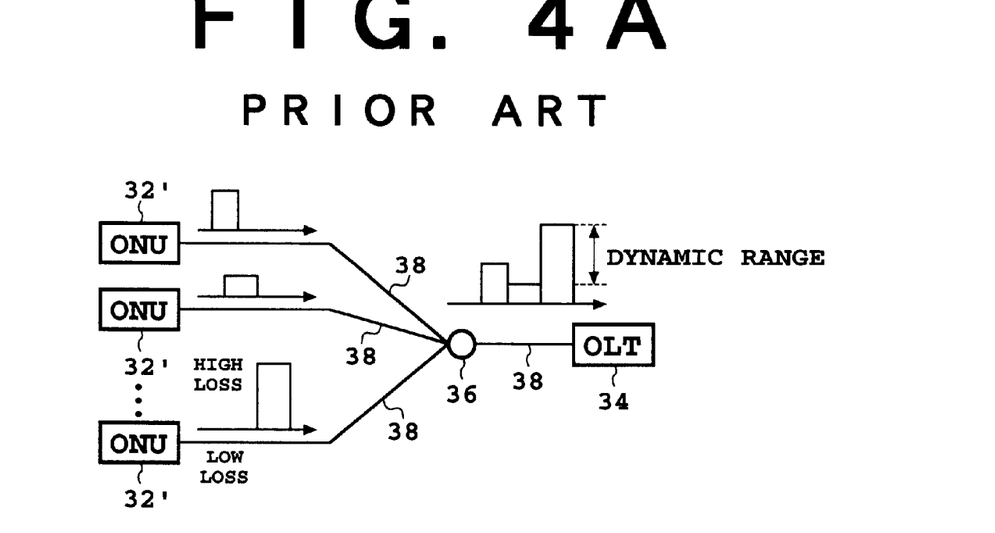
FIG. 4A is a block diagram of a system in the prior art.
Figure 4B:
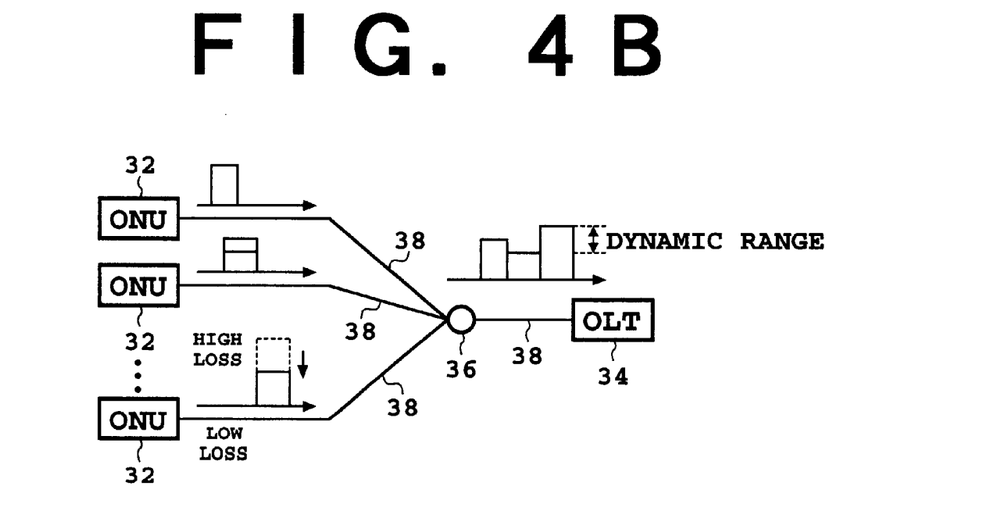
FIG. 4B is a block diagram showing a preferred embodiment of the system according to the present invention.

FIG. 4A is a block diagram of a system in the prior art, and FIG. 4B is a block diagram showing a preferred embodiment of the system according to the present invention. The system shown in FIG. 4B is configured by connecting a plurality of ONUs 32 as subscriber terminals each having the configuration shown in FIG. 1 and a single OLT 34 through a star coupler 36. The star coupler 36, each ONU 32, and the OLT 34 are connected together by optical fiber transmission lines 38. Each ONU 32 includes a light source for outputting an optical signal having a wavelength $\lambda 2$ toward the OLT 34, and the OLT 34 includes a light source for outputting an optical signal having a wavelength &K1 toward each ONU 32.

In the prior art shown in FIG. 4A, a plurality of ONUs 32' each not adopting the present invention are provided in place of the ONUs 32. Each ONU 32' outputs an optical signal toward the OLT 34 with a constant transmitting power. In the case that losses in the optical fiber transmission lines 38 connecting the ONUs 32' and the star coupler 36 are different from each other, the receiving power of the OLT 34 is smaller for the optical fiber transmission line 38 having a higher loss, and is larger for the optical fiber transmission line 38 having a lower loss. As a result, the power reaching the OLT 34 reflects the transmission line loss as it stands, and the dynamic range is large.

In the system shown in FIG. 4B, the receiving power of each ONU 32 reflects the transmission line loss according to the present invention. By utilizing this feature, the transmitting power of each ONU 32 is increased in the case that the receiving power of each ONU 32 is small, whereas the transmitting power of each ONU 32 is decreased in the case that the receiving power of each ONU 32 is large. Furthermore, the prebias circuit 8 outputs a bias current immediately before the first bit of the burst signal is generated (e.g., within a time period corresponding to two bits). By performing this control, the dynamic range in the receiving section of the OLT 34 can be reduced, and this reduction can be assigned to an increase in the number of subscribers, an increase in transmission distance, or a decrease in transmission distance, for example. This will now be described more specifically.

Figure 5A:
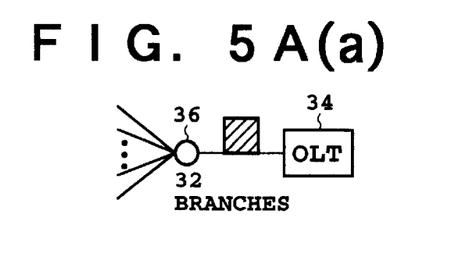
Figure 5B:
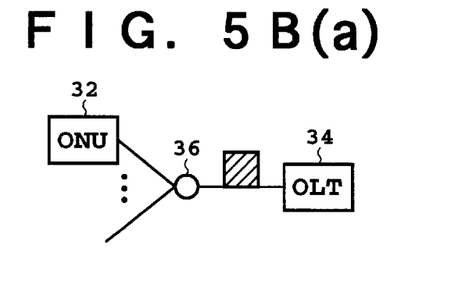
Figure 5C:
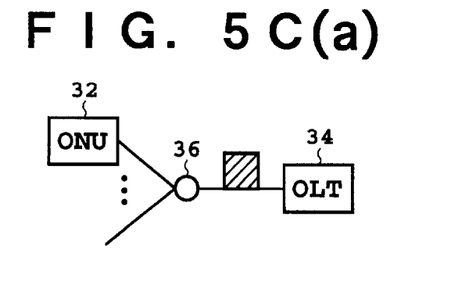

FIGS. 5A(a) and 5A(b) illustrate the case of increasing the number of subscribers. In this case, the number of branches from the star coupler 36 toward the ONUs 32 is increased from 32 to 64. Even when the transmitting power of each ONU 32 is increased by 3 dB, the power reaching the OLT 34 is maintained constant. Thus, the number of subscribers can be increased with the receiving power of the receiving section in the OLT 34 being constant. FIGS. 5B(a) and 5B(b) illustrate the case of increasing a transmission distance. In this case, a certain one of the ONUs 32 is relocated from an original position shown in FIG. 5B(a) to a far position shown in FIG. 5B(b). By increasing the transmitting power of this relocated ONU 32, the receiving power of the OLT 34 can be maintained constant. FIGS. 5C(a) and 5C(b) illustrate the case of decreasing a transmission distance. In this case, a certain one of the ONUs 32 is relocated from an original position shown in FIG. 5C(a) to a near position shown in FIG. 5C(b). By decreasing the transmitting power of this relocated ONU 32, the receiving power of the OLT 34 can be maintained constant. In this manner, the extension of a network can be easily realized with the power of an optical signal from each ONU 32 to the receiving section of the OLT 34 being maintained constant.

Figure 6:
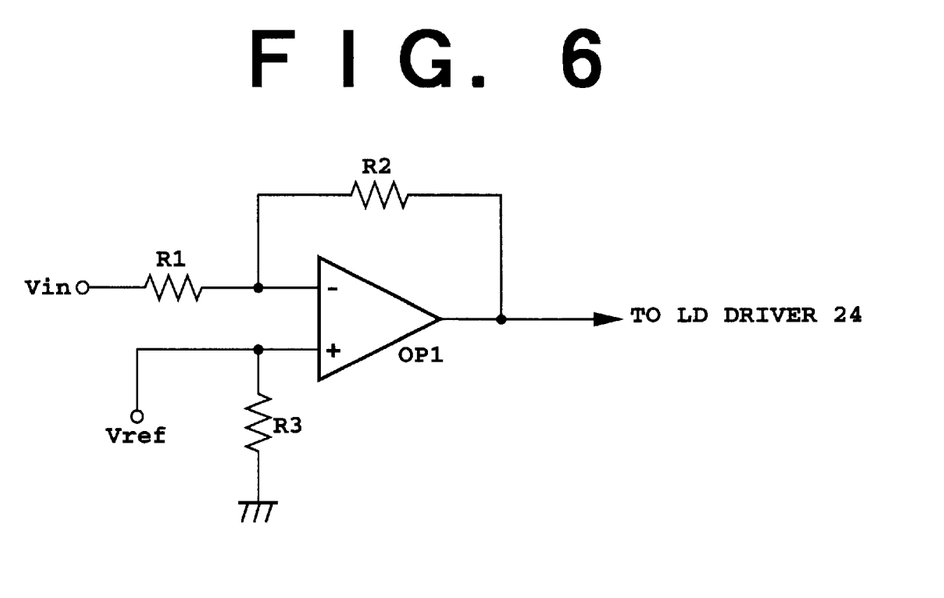
FIG. 6 is a circuit diagram of a drive current control circuit shown in FIG. 1.
Figure 7:
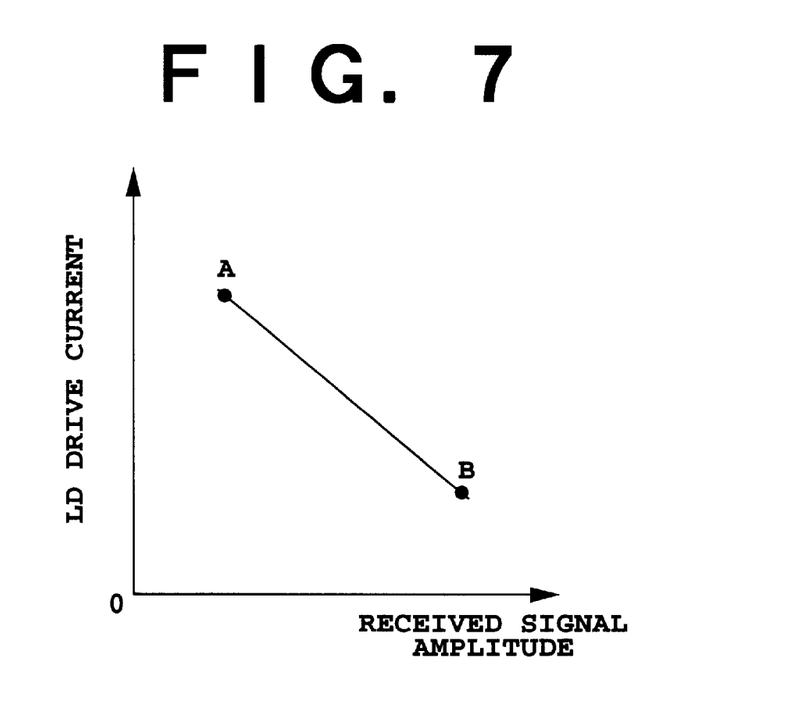
FIG. 7 is a graph showing the relation between LD drive current and received signal amplitude.

Referring to FIG. 6, there is shown a circuit diagram of the drive current control circuit 28 shown in FIG. 1. An inverting amplifier is configured by an operational amplifier OP1 and resistors R1, R2, and R3. A voltage input Vin from the amplitude detecting circuit 26 (see FIG. 1) is supplied through the resistor R1 to an inverting input port of the operational amplifier OP1. A reference voltage Vref is supplied to a noninverting input port of the operational amplifier OP1. The noninverting input port is grounded through the resistor R3. The inverting input port and an output port of the operational amplifier OP1 are connected by the resistor R2. The gain of this inverting amplifier is given as R2/R1. By properly setting the values of the resistors R1 and R2 and the reference voltage Vref, the transmitting power of each ONU 32 can be made variable in such a manner that when the amplitude of a received signal is small, the LD drive current is made large, whereas when the amplitude of the received signal is large, the LD drive current is made small as shown in FIG. 7.

The prebias circuit 8 shown in FIG. 1 has a function of decreasing the oscillation delay jitter even when the LD drive current is small. As a result, the dynamic range in the transmitting section 2 of each ONU 32 can be made large. When the amplitude of the received signal is relatively small as shown by a point A in FIG. 7, the LD drive current is set to a value giving the upper limit of the power determined by the rated value of the LD 22, for example. When the amplitude of the received signal is large as shown by a point B in FIG. 7, the LD drive current is set to a value giving the lower limit of the power determined by the prescribed value of the oscillation delay jitter.

Figure 8:
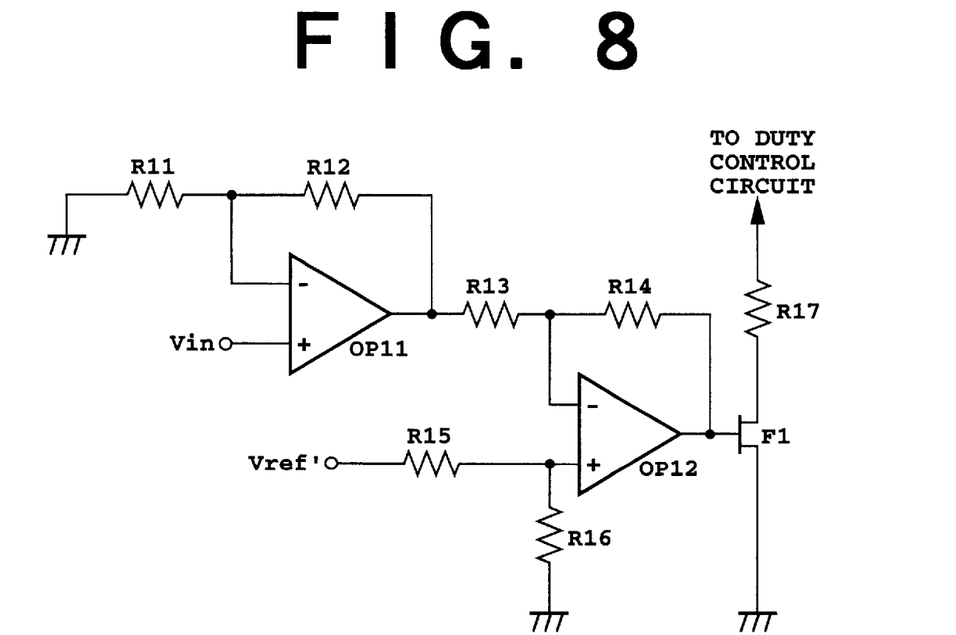
FIG. 8 is a circuit diagram of a duty compensating circuit shown in FIG. 1.

Referring to FIG. 8, there is shown a circuit diagram of the duty compensating circuit 30 shown in FIG. 1. An inverting input port of an operational amplifier OP11 is grounded through a resistor R11. An output voltage Vin from the amplitude detecting circuit 26 is supplied to a noninverting input port of the operational amplifier OP11. The inverting input port and an output port of the operational amplifier OP11 are connected by a resistor R12. The output port of the operational amplifier 11 is connected through a resistor R13 to an inverting input port of an operational amplifier OP12. A reference voltage Vref' is supplied through a resistor R15 to a noninverting input port of the operational amplifier OP12. The noninverting input port of the operational amplifier OP12 is grounded through a resistor R16. The inverting input port and an output port of the operational amplifier OP12 is connected by a resistor R14. The output port of the operational amplifier OP12 is connected to the gate of an FET (field effect transistor) F1. The source of the FET F1 is grounded, and the drain of the FET F1 is connected through a resistor R17 to a duty control circuit. The duty control circuit is incorporated in the LD driver 24 shown in FIG. 1, for example.

A noninverting amplifier is configured by the resistors R11 and R12 and the operational amplifier OP11. Accordingly, the voltage signal Vin corresponding to the receiving power of each ONU 32 is amplified. An adder is configured by the resistors R13, R14, R15, and R16 and the operational amplifier OP12. This adder functions to add the reference voltage Vref' to a signal amplified by the noninverting amplifier. A resultant signal obtained by the addition is input into the gate of the FET F1. Accordingly, a voltage change is converted into a current change, and the duty control circuit is adjusted through a voltage drop at the resistor R17. The relation between the gate voltage of the FET F1 and the duty control circuit is preliminarily measured to obtain a gate voltage corresponding to a duty of 100%. By setting the values of the resistors R11 and R12 in conformity with this voltage, the duty of the optical signal to be output from the laser diode 22 (see FIG. 1) can be maintained substantially constant, thus allowing duty compensation.

Alternatively, the duty of the optical signal to be output from the laser diode 22 may be maintained substantially constant by decreasing and increasing the bias current according to an increase and decrease in the amplitude of the drive current for the laser diode 22, respectively. This will now be described more specifically.

In general, the oscillation time delay td of a laser diode (semiconductor laser) is given by Eq. (1).

$$td = \tau ln\{Ip/[Ip-(Ith-Ib)]\} \quad (1)$$

where τ is the carrier lifetime, and Ip, Ith, and Ib are the drive current, threshold current, and bias current for the laser diode. To make the duty constant, it is sufficient that the antilogarithm in Eq. (1) be constant. In other words, it is sufficient that Eq. (2) hold with the use of a constant k.

$$Ip/[Ip-(Ith-Ib)]=k \quad (2)$$

Eq. (2) is transformed to obtained Eq. (3).

$$Ib=(1/k-1)Ip+Ith \quad (3)$$

Figure 9:
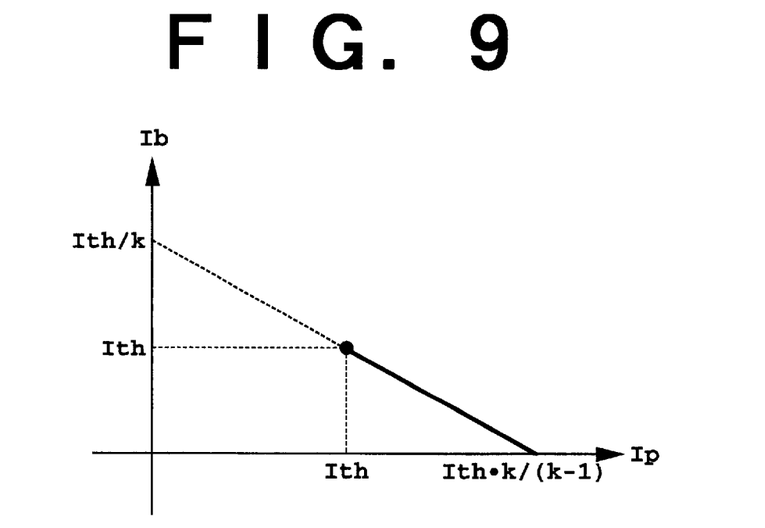
FIG. 9 is a graph showing the relation between bias current Id and drive current Ip for a laser diode.

The relation between the bias current Ib and the drive current Ip is shown by the graph in FIG. 9 in accordance with Eq. (3). By changing the bias current according to the drive current for the semiconductor laser so that the solid line in the graph is satisfied, the oscillation time delay td can be made constant, thereby obtaining a substantially constant duty.

Figure 10:
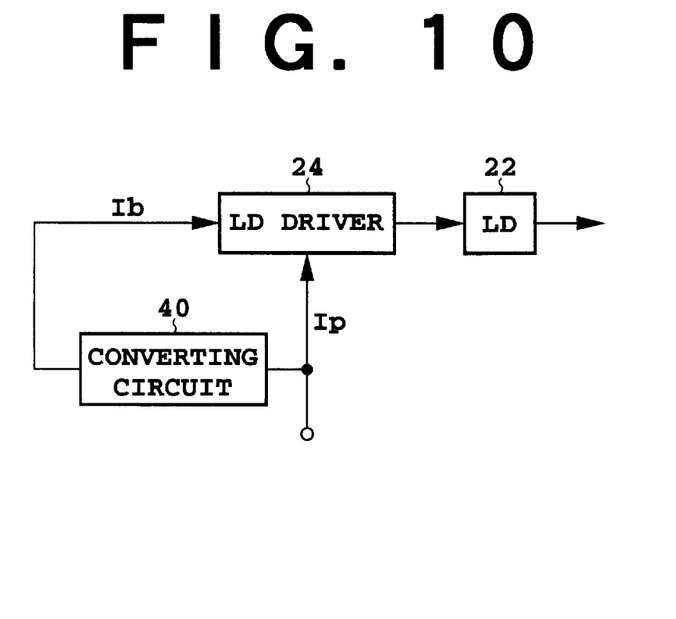
FIG. 10 is a circuit diagram for obtaining the relation shown in FIG. 9.

FIG. 10 is a block diagram showing a preferred embodiment for obtaining a constant duty. A converting circuit 40 is provided to determine the bias current Ib according to the drive current Ip so as to satisfy the relation shown in FIG. 9, thereby obtaining a constant duty irrespective of power variations.

Figure 11:
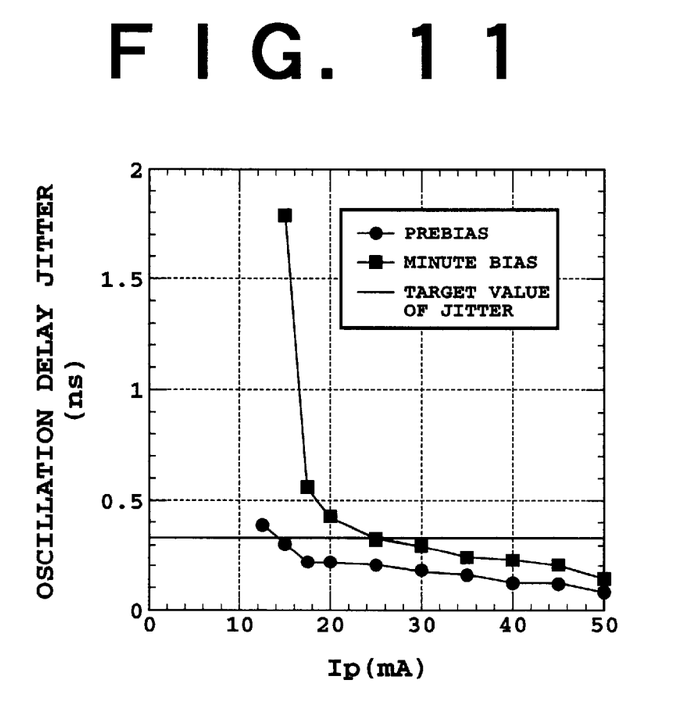
FIG. 11 is a graph showing an experimental result of the relation between oscillation delay jitter and LD drive current Ip.

FIG. 11 is a graph showing an experimental result of the relation between the oscillation delay jitter and the LD drive current Ip obtained in the preferred embodiment shown in FIG. 1. This graph substantially corresponds to the graph shown in FIG. 3. The measurement was made under the conditions of room temperature, a mark rate of ½, an upstream bit rate of 155.52 Mbps, and a downstream bit rate of 622.08 Mbps. The threshold current Ith was set to 7.6 mA. As a target value (prescribed value) of the oscillation delay jitter, 5% (300 ps) of the pulse width was set. Under these conditions, a minimum value of the drive current Ip satisfying the target value in the case of applying a prebias (Ib=3.5 mA) was compared with that in the case of applying a minute bias (Ip=0.13 mA). As apparent from FIG. 11, the minimum value of the drive current Ip in the case of the prebias is 15 mA, whereas the minimum value of the drive current Ip in the case of the minute bias is 28 mA. This reduction corresponds to a reduction of about 4.5 dB on the basis of optical output power. Thus, the advantage of the prebias was confirmed.

Figure 12:
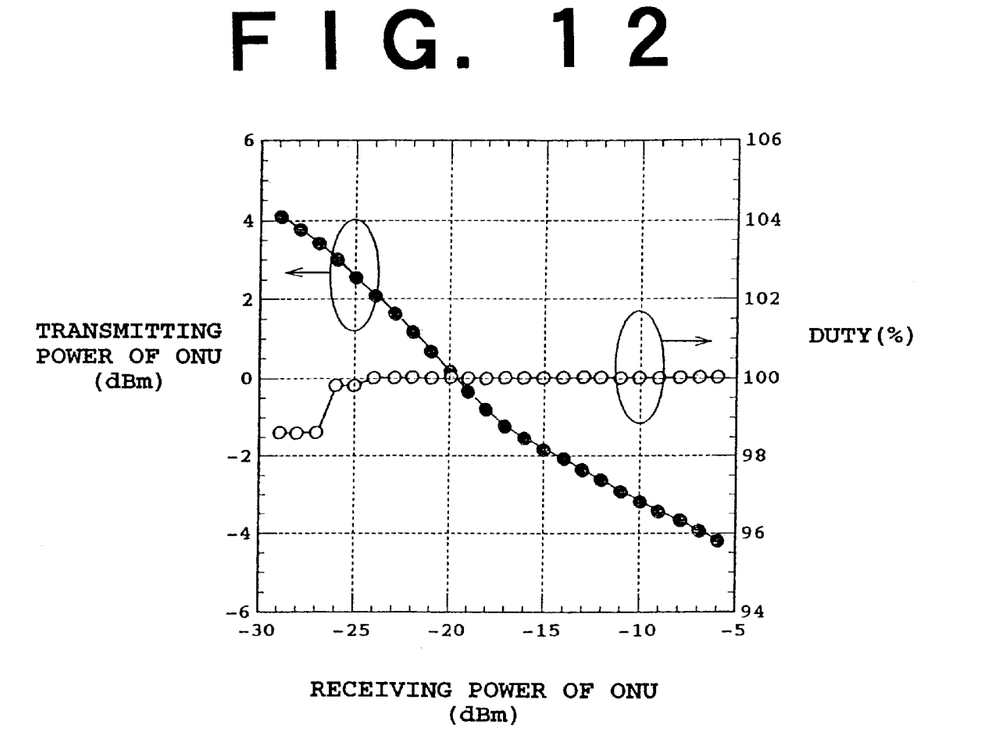
FIG. 12 is a graph showing an experimental result of optical power control by the preferred embodiment shown in FIG. 1.

Further, an optical power control experiment was performed by the preferred embodiment shown in FIG. 1 on the basis of the result shown in FIG. 11. The result of this experiment is shown in FIG. 12. It was confirmed that the transmitting power of each ONU can be changed from +4.1 dBm to −4.2 dBm with a change in the receiving power of each ONU from −29 dBm to −6 dBm and that the range of duty variations can be suppressed to a substantially constant value by the duty compensating circuit 30.

According to the present invention as described above, the transmitting power of the second terminal device (ONU) is controlled according to its receiving power. Accordingly, the dynamic range of the transmitting power of the second terminal device can be increased. Further, the dynamic range in the receiving section of the first terminal device (OLT) can be reduced, and this reduction can be assigned to the extension of a network. In particular, by adopting a prebias circuit according to a preferred embodiment of the present invention, the transmitting power satisfying a prescribed value of the oscillation delay jitter can be sufficiently reduced. Thus, it is possible to provide an optical transmission path system improved in the characteristics of a network, and it is also possible to provide a terminal device applicable to such an optical transmission system.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A PON system comprising:
a terminal device;
a plurality of subscriber terminals;
at least one star coupler provided according to number of said plurality of subscriber terminals;
an first optical fiber transmission line connecting said terminal devices and said at least one star coupler; and
a plurality of second optical fiber transmission lines connecting said plurality of subscriber terminals and said at least one star coupler;
said terminal device comprising a first light source for outputting a first optical signal to said first optical fiber transmission line;
each of said plurality of subscriber terminals comprising:
a second light source;
a drive circuit for supplying a drive current to said second light source so that said second light source outputs a second optical signal to one of said second optical fiber transmission lines;
a photodetector receiving said first optical signal from said one of said second optical fiber transmission lines;
an amplitude detecting circuit detecting the amplitude of an output from said photodetector; and
a control circuit decreasing and increasing said drive current according to an increase and decrease in the amplitude detected by said amplitude detecting circuit, respectively;
wherein each transmitting power of said plurality of subscriber terminals is controlled according to each receiving power of said plurality of subscriber terminals, thereby increasing dynamic range of the transmitting power of each of said plurality of subscriber terminals.

2. A PON system according to claim 1, wherein each of said plurality of subscriber terminals device further comprises a prebias circuit adding a bias current to said drive current so that the oscillation delay jitter of said second optical signal decreases.

3. A PON system according to claim 2, wherein:
said second optical signal comprises a burst signal;
said prebias circuit outputting said bias current immediately before the first bit of said burst signal is generated.

4. A PON system according to claim 2, wherein said second light source comprises a laser diode.

5. A PON system according to claim 2, wherein each of said plurality of subscriber terminals further comprises a circuit decreasing and increasing said bias current according to an increase and decrease in the amplitude of said drive current, respectively, thereby maintaining the duty of said second optical signal constant.

6. A PON system according to claim 1, wherein each of said plurality of subscriber terminals further comprises a circuit controlling said second light source so that the duty of said second optical signal is maintained constant, according to the amplitude detected by said amplitude detecting circuit.

7. A PON system comprising:
plurality of subscriber terminals
at least one star coupler provided according to a number of said plurality of subscriber terminals; and
a plurality of first optical fiber transmission lines connecting said plurality of subscriber terminals and said at least one star coupler;
each of said plurality of subscriber terminals comprising:
a light source;
a drivecircuit for supplying a drive current to said light source so that said light source outputs a first optical signal to one of said first optical fiber transmission lines;
a photodetector receiving a second optical signal from said one of said first optical fiber transmission lines;

an amplitude detecting circuit detecting the amplitude of an output from said photodetector; and a control circuit decreasing and increasing said drive current according to an increase and decrease in the amplitude detected by said amplitude detecting circuit, respectively, wherein each transmitting power of said plurality of subscriber terminals is controlled according to each receiving power of said plurality of subscriber terminals, thereby increasing dynamic range of the transmitting power of each of said plurality of subscriber terminals.

8. A PON system according to claim 7, wherein said light source comprises a semiconductor laser, and each of said plurality of said subscriber terminals further comprises a prebias circuit adding a bias current to said drive current so that an oscillation delay jitter of said second optical signal decreases; and said bias current is obtained by adding a threshold current of said semiconductor laser to a value of said drive current multiplied by a fixed number.

9. A PON system according to claim 8, wherein:

said second optical signal comprises a burst signal;

said prebias circuit outputting said bias current immediately before the first bit of said burst signal is generated.

10. A PON system according to claim 8, wherein said light source comprises a laser diode.

11. A PON system according to claim 8, wherein each of said plurality of subscriber terminals further comprises a circuit decreasing and increasing said bias current according to an increase and decrease in the amplitude of said drive current, respectively, thereby maintaining the duty of said second optical signal constant.

12. A PON system according to claim 7, wherein said terminal device further comprising a circuit controlling said light source so that the duty of said second optical signal is maintained constant, according to the amplitude detected by said amplitude detecting circuit.

13. A system comprising:

a first terminal device;

a second terminal device; and an optical fiber transmission line connecting said first and second terminal devices;

said first terminal device comprising a first light source for outputting a first optical signal to said optical fiber transmission line;

said second terminal device comprising:

a second light source;

a drive circuit supplying a drive current to said second light source so that said second light source outputs a second optical signal to said optical fiber transmission line;

a photodetector receiving said first optical signal from said optical fiber transmission line;

an amplitude detecting circuit detecting the amplitude of an output from said photodetector;

a prebias circuit adding a bias current to said drive current so that an oscillation delay jitter or said second optical signal decreases; and a control circuit decreasing and increasing said drive current according to an increase and decrease in the amplitude detected by said amplitude detecting circuit, respectively, wherein said transmitting power of said second terminal device is controlled according to receiving power of the second terminal device, thereby increasing dynamic range of the transmitting power of the second terminal device, and wherein said second light source comprising a semiconductor laser, and said bias current is obtained by adding a threshold current of said semiconductor laser to a value of said drive current multiplied by a fixed number.

14. The system according to claim 13, wherein said second terminal device further comprises a circuit decreasing and increasing said bias current according to an increase and decrease in the amplitude of said drive current, respectively, thereby maintaining the duty of said second optical signal constant.

15. A terminal device comprising:

a photodetector receiving a first optical signal;

an amplitude detecting circuit detecting the amplitude of an output from said photodetector;

a light source;

a drive circuit supplying a drive current to said light source so that said light source outputs a second optical signal;

a control circuit decreasing and increasing said drive current according to an increase and decrease in the amplitude detected by said amplitude detecting circuit;

a prebias circuit adding a bias current to said drive current so that an oscillation delay jitter of said second optical signal decreases; and a circuit controlling said light source so that the duty of said second optical signal is maintained constant, according to the amplitude detected by said amplitude detecting circuit, wherein transmitting power of said terminal device is controlled according to receiving power of the terminal device, thereby increasing dynamic range of the transmitting power of the terminal device, and wherein said light source comprising a semiconductor laser and said bias current is obtained by adding a threshold current of said semiconductor laser to a value of said drive current multiplied by a fixed number.

16. The terminal device according to claim 15, wherein said second terminal device further comprises a circuit decreasing and increasing said bias current according to an increase and decrease in the amplitude of said drive current, respectively, thereby maintaining the duty of said second optical signal constant.

* * * * *

UNITED STATES PATENT AND TRADEMARK OFFICE
CERTIFICATE OF CORRECTION

PATENT NO. : 6,901,222 B2  
DATED : May 31, 2005  
INVENTOR(S) : Shinji Yamashita et al.

Page 1 of 1

It is certified that error appears in the above-identified patent and that said Letters Patent is hereby corrected as shown below:

<u>Title page,</u>  
Item [56], References Cited, FOREIGN PATENT DOCUMENTS, change "06-161555" to -- 06-061555 --.

<u>Column 8,</u>  
Line 54, before "plurality" insert -- a --.

<u>Column 10,</u>  
Line 2, change "or" to -- of --.

Signed and Sealed this

Eleventh Day of April, 2006

JON W. DUDAS  
*Director of the United States Patent and Trademark Office*